(12) United States Patent
Kim

(10) Patent No.: US 8,974,931 B2
(45) Date of Patent: Mar. 10, 2015

(54) CYLINDRICAL LITHIUM ION SECONDARY BATTERY

(71) Applicant: Samsung SDI Co., Ltd., Yongin, Gyeonggi-do (KR)

(72) Inventor: Daekyu Kim, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 118 days.

(21) Appl. No.: 13/745,662

(22) Filed: Jan. 18, 2013

(65) Prior Publication Data

US 2014/0045000 A1 Feb. 13, 2014

(30) Foreign Application Priority Data

Aug. 8, 2012 (KR) .......................... 10-2012-0086925

(51) Int. Cl.
*H01M 2/12* (2006.01)
*H01M 2/02* (2006.01)
*H01M 10/0525* (2010.01)

(52) U.S. Cl.
CPC ............ *H01M 2/1241* (2013.01); *H01M 2/022* (2013.01); *H01M 10/0525* (2013.01); *Y02E 60/122* (2013.01); *Y02T 10/7011* (2013.01)
USPC ........................................................ 429/56

(58) Field of Classification Search
CPC . Y02E 60/12; Y02E 60/122; H01M 10/0525; H01M 2/022; H01M 2/121294
USPC ........................................................ 429/56
See application file for complete search history.

(56) References Cited

U.S. PATENT DOCUMENTS

| | | | |
|---|---|---|---|
| 7,140,380 B2 * | 11/2006 | Marubayashi et al. | .... 137/68.25 |
| 2006/0292437 A1 | 12/2006 | Matsumoto et al. | |
| 2008/0070098 A1 * | 3/2008 | Ray, et al. | ........................ 429/53 |
| 2009/0233157 A1 * | 9/2009 | Kim | ................................. 429/53 |
| 2011/0123854 A1 | 5/2011 | Kim | |
| 2012/0077062 A1 * | 3/2012 | Fuhr et al. | ........................ 429/56 |

FOREIGN PATENT DOCUMENTS

| | | |
|---|---|---|
| JP | 10-092397 | 10/1998 |
| JP | 2006147267 | 6/2006 |
| KR | 1020070030686 | 3/2007 |
| KR | 1020090105547 | 10/2009 |
| KR | 1020110058382 | 6/2011 |
| WO | WO 2010/120906 A2 | 10/2010 |

OTHER PUBLICATIONS

Extended European Search Report dated Nov. 28, 2013 for corresponding EP Application No. 13168488.8.

* cited by examiner

*Primary Examiner* — Stewart Fraser
(74) *Attorney, Agent, or Firm* — Knobbe Martens Olson & Bear LLP

(57) ABSTRACT

The present disclosure relates to a cylindrical lithium ion secondary battery, which can prevent a cylindrical can from being cracked due to an external shock applied during an assembling process while controlling a rupture pressure of the cylindrical can. The cylindrical lithium ion secondary battery includes a cylindrical can, an electrode assembly accommodated in the cylindrical can with an electrolyte, and a cap assembly sealing the cylindrical can, wherein the cylindrical can has a cylindrical bottom portion and a side portion extending from the bottom portion to the cap assembly, and a safety vent having a thickness gradient is formed on the bottom portion.

15 Claims, 8 Drawing Sheets

CYLINDRICAL LITHIUM ION SECONDARY BATTERY

RELATED APPLICATIONS

This application claims priority to and the benefit of Korean Patent Application No. 10-2012-0086925 filed on Aug. 8, 2012, in the Korean Intellectual Property Office, the disclosure of which is incorporated in its entirety herein by reference.

BACKGROUND

1. Field

The present technology relates to a cylindrical lithium ion secondary battery.

2. Description of the Related Technology

Lithium ion secondary batteries are being widely used in portable electronic devices and power sources of hybrid automobiles or electric vehicles because of various advantages, including a high operation voltage, a high energy density per unit weight, and so forth.

The lithium ion secondary battery can be largely classified as cylinder type secondary battery, a prismatic type secondary battery, a pouch type secondary battery. Specifically, the cylindrical lithium ion secondary battery generally includes a cylindrical electrode assembly, a cylindrical can coupled to the electrode assembly, an electrolyte injected into the can to allow movement of lithium ions, and a cap assembly coupled to one side of the can to prevent leakage of the electrolyte and separation of the electrode assembly.

SUMMARY

An aspect of the present invention provides a cylindrical lithium ion secondary battery, which can prevent a cylindrical can from being cracked due to an external shock applied during an assembling process while controlling a rupture pressure of the cylindrical can.

According to at least one of embodiments, a cylindrical lithium ion secondary battery is provided, including a cylindrical can, an electrode assembly accommodated in the cylindrical can with an electrolyte, and a cap assembly sealing the cylindrical can, wherein the cylindrical can has a cylindrical bottom portion and a side portion extending from the bottom portion to the cap assembly, and a safety vent having a thickness gradient is formed on the bottom portion.

According to an embodiment, the bottom portion of the safety vent may include a first surface directed toward the electrode assembly, a second surface opposite to the first surface and being planar, and the safety vent may be formed on the second surface.

The safety vent may be shaped of a circle concentric with the bottom portion and having a diameter different from that of the bottom portion.

The safety vent may further include a third surface disposed between the first surface and the second surface and a pair of spaced-apart fourth surfaces connecting the third surface and the second surface.

The third surface may have a gradient with respect to the first surface.

The safety vent may include a first region having a thickness between the first surface and the third surface being 10% to 20% of a thickness between the first surface and the second surface, and a second region having a thickness between the first surface and the third surface being 30% to 40% of a thickness between the first surface and the second surface and the third surface between the first region and the second region has a gradient with respect to the first surface.

The first region and the second region may be positioned on the circumference and alternate with each other at an angular interval of 90°.

A third region having a uniform thickness may further be formed between the first region and the second region.

The third region may include the first surface and a fifth surface opposite to the first surface and a thickness between the first surface and the fifth surface may be 60% to 70% of the thickness between the first surface and the second surface.

A thickness ranging from the second region to the third region may gradually decrease.

A thickness ranging from the second region to the third region may gradually increase.

The pair of fourth surfaces may be formed at an angle of 28° to 30°.

A curved surface may be disposed between the third surface and the fourth surface.

In the cylindrical lithium ion secondary battery according to one embodiment of the present invention, since a safety vent having a gradient is formed on a bottom of the cylindrical can, the cylindrical can may be prevented from being cracked due to an external shock applied during an assembling process while controlling a rupture pressure of the cylindrical can.

In another aspect, the aforementioned needs are satisfied by a lithium ion secondary battery comprising a can, an electrode assembly positioned within the can with an electrolyte and a cap assembly sealing the can. In this aspect, the can has a bottom portion and a side portion that extend from the bottom portion to the cap assembly, and wherein a safety vent having a first length is formed in the bottom portion and wherein the thickness of the safety vent varies over the first length of the safety vent. In one embodiment, the can is cylindrical and the safety vent is circular having a circumference equal to the first length.

BRIEF DESCRIPTION OF THE DRAWINGS

The accompanying drawings are included to provide further understanding of the present disclosure, and are incorporated in and constitute a part of this specification. The drawings illustrate certain embodiments of the present disclosure and, together with the description, serve to explain principles of the present disclosure. In the drawings.

DETAILED DESCRIPTION

Certain embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1A:
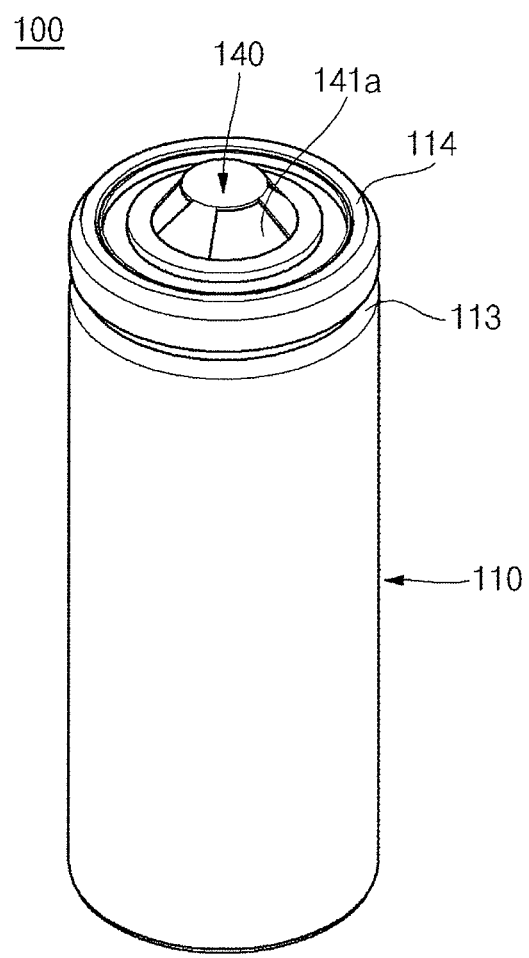
FIGS. 1A, 1B and 1C are a perspective view, a cross-sectional view and an exploded perspective view of a cylindrical lithium ion secondary battery according to an embodiment of the present invention.
Figure 1B:
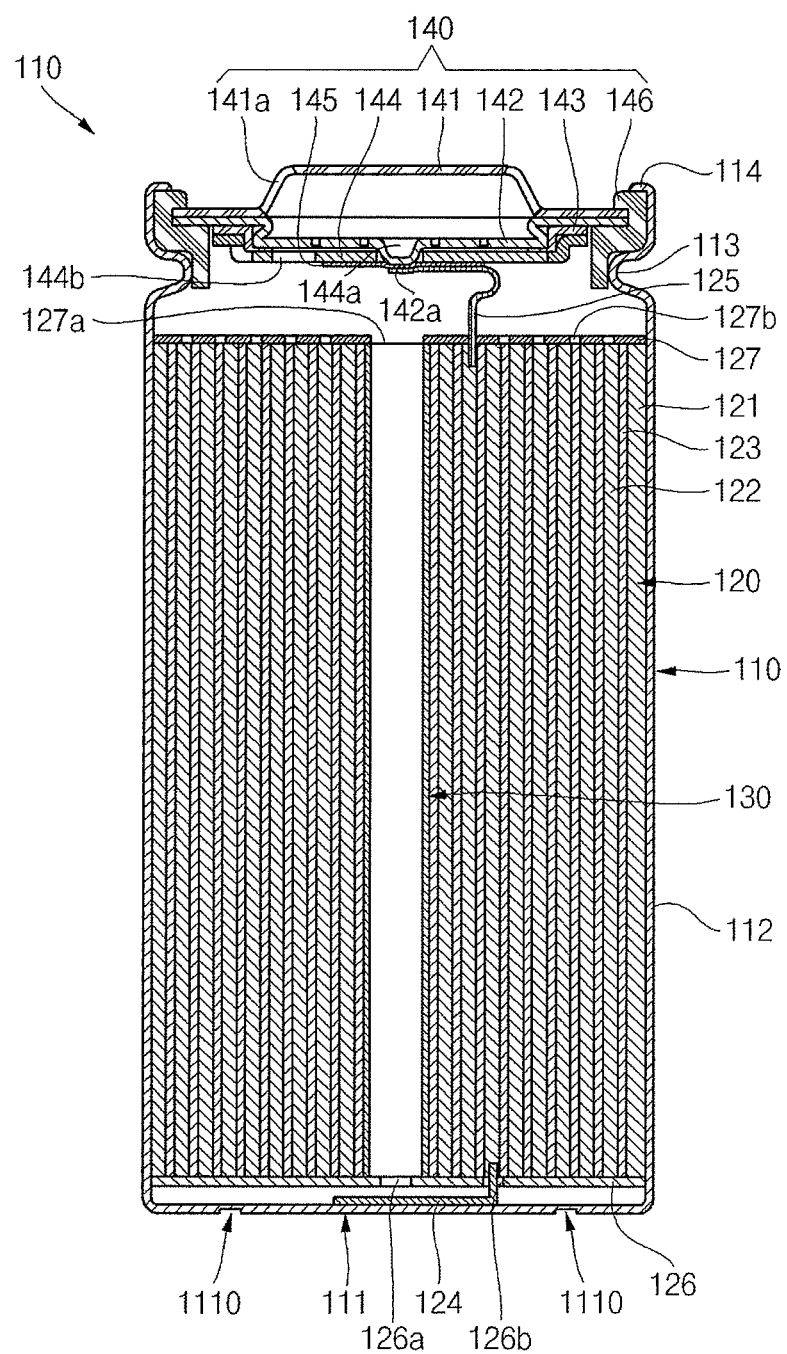
Figure 1C:
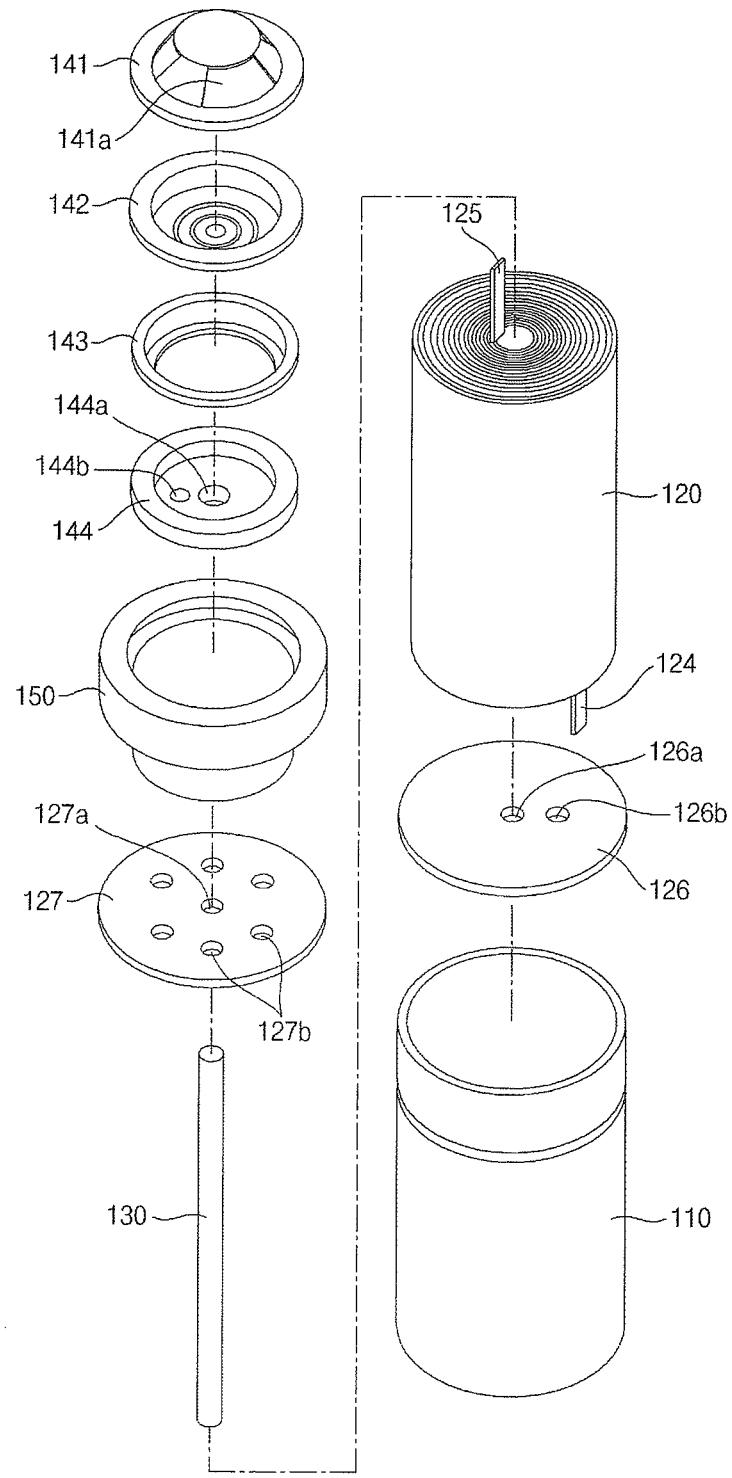

FIGS. 1A, 1B and 1C are a perspective view, a cross-sectional view and an exploded perspective view of a cylindrical lithium ion secondary battery according to an embodiment of the present invention.

As shown in FIGS. 1A, 1B and 1C, the cylindrical lithium ion secondary battery 100 includes a cylindrical can 110, an electrode assembly 120, a center pin 130, and a cap assembly 140.

The cylindrical can 110 includes a circular bottom portion 111 and a side portion 112 upwardly extending by a predetermined length from the bottom portion 111. In the course of manufacturing the secondary battery, a top portion of the cylindrical can 110 is opened. Therefore, during manufacturing of the secondary battery, the electrode assembly 120 and the center pin 130 may be inserted into the cylindrical can 110 together with an electrolyte. The cylindrical can 110 may be made of steel, stainless steel, aluminum, an aluminum alloy or equivalents thereof, but aspects of the present invention are not limited thereto. In addition, the cylindrical can 110 includes an inwardly recessed beading part 113 formed at a lower portion of the cap assembly 140 to prevent the cap assembly 140 from being deviated to the outside, and an inwardly bent crimping part 114 formed at an upper portion of the cap assembly 140.

Meanwhile, a safety vent 1110 having a thickness smaller than that of the bottom portion 111 of the cylindrical can 110 and having a thickness gradient is formed at the bottom portion 111. The term "thickness gradient" used herein means that the thickness of the safety vent 1110 is distributed with a constant angle formed with respect to a predetermined horizontal surface. When the internal pressure of the cylindrical can 110 abnormally increases, the safety vent 1110 is ruptured and the internal gas of the cylindrical can 110 is discharged to the outside. In addition, the safety vent 1110 according to the present invention is designed to have a thickness gradient, thereby controlling the rupture pressure of the safety vent 110 and preventing a crack phenomenon occurring due to an external shock during an assembling process. The safety vent 1110 having a thickness gradient will be below described in more detail.

The electrode assembly 120 is accommodated in the cylindrical can 110. The electrode assembly 120 includes a negative electrode plate 121 coated with a negative electrode active material (e.g., graphite, carbon, etc.), a positive electrode plate 122 coated with a positive electrode active material (e.g., a transition metal oxide, such as $LiCoO_2$, $LiNiO_2$, $LiMn_2O_4$, etc.), and a separator 123 positioned between the negative electrode plate 121 and the positive electrode plate 122 to prevent an electric short and allowing only movement of lithium ions. The negative electrode plate 121, the positive electrode plate 122 and the separator 123 are wound up in a substantially cylindrical shape. Here, the negative electrode plate 121 may be made of a copper (Cu) foil, and the positive electrode plate 122 may be made of an aluminum (Al) foil, and the separator 123 may be made of polyethylene (PE) or polypropylene (PP), but aspects of the present invention are not limited to the above materials. In addition, a negative electrode tab 124 projected downwardly and extending with a predetermined length may be welded to the negative electrode plate 121 and a positive electrode tab 125 projected upwardly with a predetermined length may be welded to the positive electrode plate 122, and vice versa. In addition, the negative electrode tab 124 may be made of nickel (Ni) and the positive electrode tab 125 may be made of aluminum (Al), but aspects of the present invention are not limited to the above materials.

In addition, the negative electrode tab 124 of the electrode assembly 120 may be welded to the bottom portion 111 of the cylindrical can 110. Therefore, the cylindrical can 110 may function as a negative electrode. To the contrary, the positive electrode tab 125 may be welded to the bottom portion 111 of the cylindrical can 110, and in this case, the cylindrical can 110 may function as a positive electrode.

In addition, a first insulating plate 126 coupled to the cylindrical can 110 and having a first hole 126a formed at its central portion and a second hole 126b formed at its exterior side may be interposed between the electrode assembly 120 and the bottom portion 111. The first insulating plate 126 prevents the electrode assembly 120 from electrically contacting the bottom portion 111 of the cylindrical can 110. In particular, the first insulating plate 126 prevents the positive electrode plate 122 of the electrode assembly 120 from electrically contacting the bottom portion 111. Here, when a large amount of gas is generated due to abnormality of the secondary battery, the first hole 126a allows the gas to rapidly move upwardly through the center pin 130, and the second hole 126b allows the negative electrode tab 124 to pass through the same to be welded to the bottom portion 111.

In addition, a second insulating plate 127 coupled to the cylindrical can 110 and having a first hole 127a formed at its central portion and a plurality of second holes 127b formed at its exterior side may be interposed between the electrode assembly 120 and the bottom portion 111.

The second insulating plate 127 prevents the electrode assembly 120 from electrically contacting the cap assembly 140. In particular, the second insulating plate 127 prevents the negative electrode plate 121 of the electrode assembly 120 from electrically contacting the cap assembly 140. Here, when a large amount of gas is generated due to abnormality of the secondary battery, the first hole 127a allows the gas to rapidly move to the cap assembly 140, and the second holes 127b allow the positive electrode tab 125 to pass through the same to be welded to the cap assembly 140. In an electrolyte injection process, the second holes 127b allow the electrolyte to rapidly flow into the electrode assembly 120.

In addition, since diameters of the first holes 126a and 127a of the first and second insulating plates 126 and 127 are smaller than a diameter of the center pin 130, it is possible to prevent the center pin 130 from electrically contacting the bottom portion 111 of the cylindrical can 110 or the cap assembly 140 due to an external shock.

The center pin 130 is shaped of a hollow cylindrical pipe and is coupled to a substantially central portion of the electrode assembly 120. The center pin 130 may be made of steel, stainless steel, aluminum, an aluminum alloy, or polybutylene terephthalate, but not limited thereto. The center pin 130 prevents the electrode assembly 120 from being deformed during charging or discharging of the secondary battery, and may serve as a path of gas movement.

The cap assembly 140 may include a cap-up 141 having a plurality of throughholes 141a, a safety plate 142 formed under the cap-up 141, an insulating plate 143 installed under the safety plate 142, a cap-down 144 installed under the safety plate 142 and the insulating plate 143 and having first and second throughholes 144a and 144b, a sub-plate 145 fixed on a bottom surface of the cap-down 144 and electrically connected to the positive electrode tab 125, and an insulation gasket 146 insulating the sub-plate 145, the cap-up 141, the safety plate 142, the insulating plate 143, the cap-down 144 and a side portion 111 of the cylindrical can 110. Here, the insulation gasket 146 is compressed between the beading part 113 formed on the side portion 111 of the cylindrical can 110 and the crimping part 114. In addition, the throughholes 141a, 144a and 144b formed in the cap-up 141 and the cap-down 144 discharges the internal gas to the outside when an internal pressure of the cylindrical can 110 increases due to abnormality of the secondary battery. The internal pressure makes the safety plate 142 upwardly reversed and electrically separated from the sub-plate 145. Then, the safety plate 142 is ruptured and the internal gas is discharged to the outside.

In addition, an electrolyte (not shown) is injected into the cylindrical can 110 and allows movement of lithium ions generated by an electrochemical reaction in the negative electrode plate 121 and the positive electrode plate 122 during charging and discharging of the battery. The electrolyte may be a nonaqueous organic electrolyte including a mixture of a lithium salt and high-purity organic solvent. In addition, the electrolyte may be a polymer using a solid electrolyte, but not limited thereto.

Figure 2A:
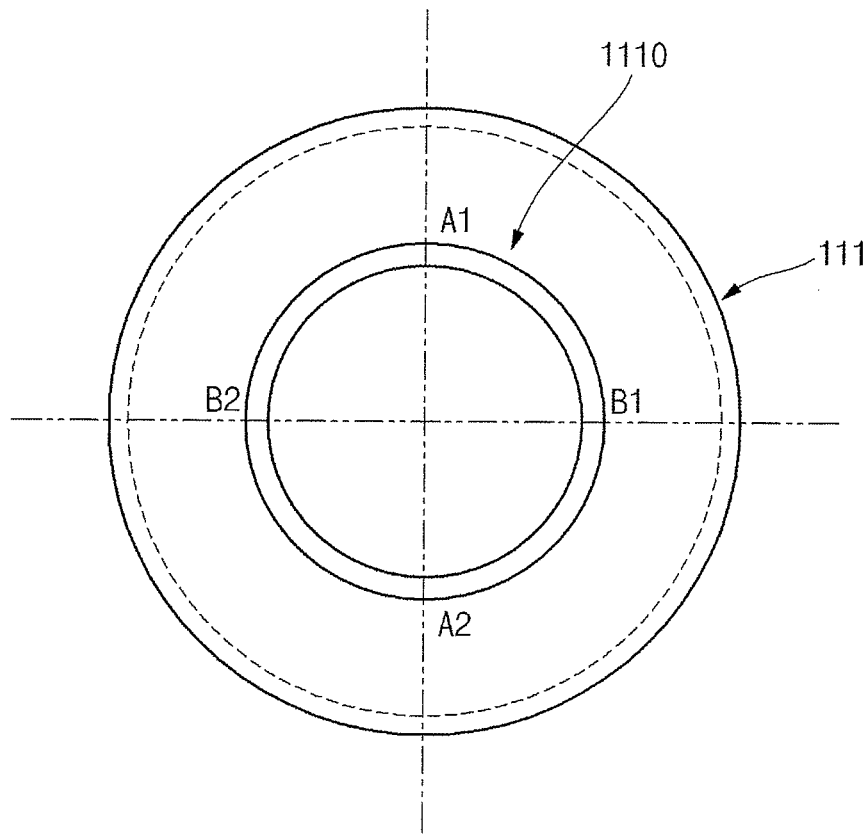
FIG. 2A is a bottom view illustrating a bottom portion of a cylindrical can in the cylindrical lithium ion secondary battery shown in FIG. 1A.
Figure 2B:
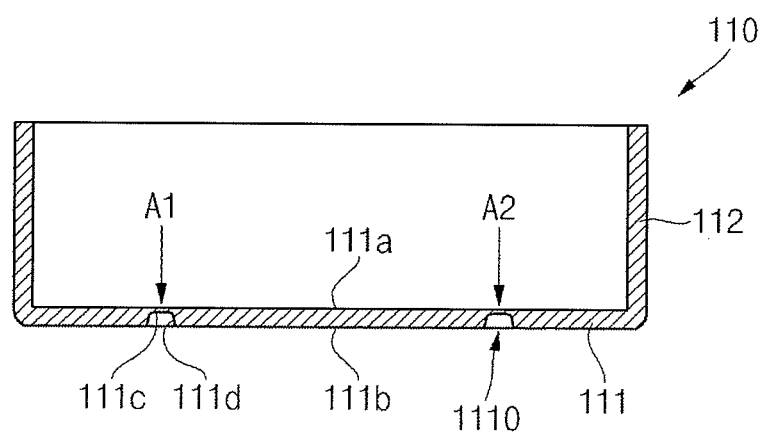
FIG. 2B is a cross-sectional view taken along the line A1-A2 of FIG. 2A.
Figure 2C:
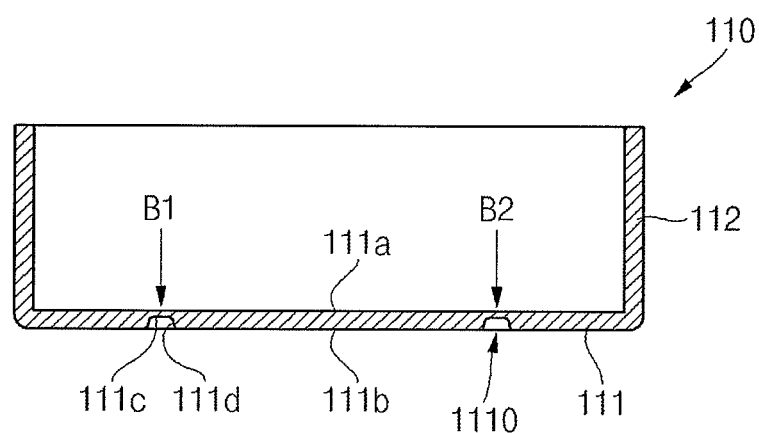
FIG. 2C is a cross-sectional view taken along the line B1-B2 of FIG. 2A.
Figure 2D:
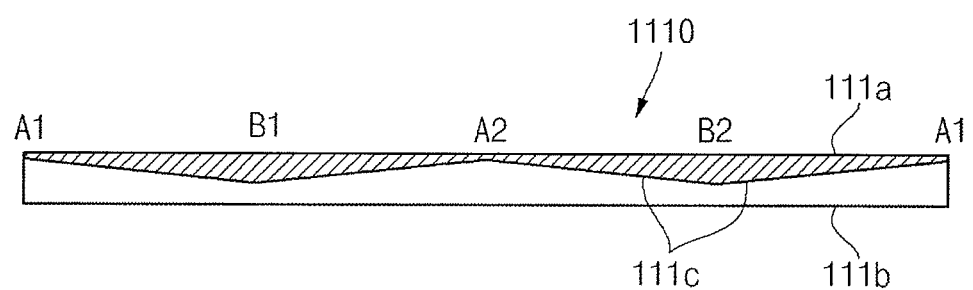
FIG. 2D is an imaginary lay-out cross-sectional view of a safety vent.

FIG. 2A is a bottom view illustrating a bottom portion of a cylindrical can in the cylindrical lithium ion secondary battery shown in FIG. 1A, FIG. 2B is a cross-sectional view taken along the line A1-A2 of FIG. 2A, FIG. 2C is a cross-sectional view taken along the line B1-B2 of FIG. 2A, and FIG. 2D is an imaginary lay-out cross-sectional view of a safety vent.

First, as shown in FIG. 2A, the safety vent 1110 having a thickness gradient is formed on a circular bottom portion 111 of the cylindrical can 110. In particular, the safety vent 1110 is shaped of a substantially circular ring having a predetermined width. The circular-ring shaped safety vent 1110 is concentric with the bottom portion 111 and has a diameter smaller than that of the bottom portion 111. In addition, as described above, a negative electrode tab is electrically connected to an internal region of the safety vent 1110 and an external electronic device (not shown) makes a contact with an external region of the safety vent 1110. Therefore, the safety vent 1110 does not interfere in electrical connection of the negative electrode tab and does not interfere in the contact with the external electronic device.

In FIG. 2A, regions denoted by A1 and A2 have the same thickness and are defined as first regions, and regions denoted by B1 and B2 also have the same thickness and are defined as second regions. However, thicknesses of the first regions A1 and A2 and thicknesses of the second regions B1 and B2 are different from each other, and a thickness gradient is formed between the first regions A1 and A2 and the second regions B1 and B2. That is to say, the safety vent 1110 has gradually increasing thicknesses from the first regions A1 and A2 to the second regions B1 and B2, and vice versa.

In addition, the first regions A1 and A2 and the second regions B1 and B2 may be positioned on the circumference and alternate with each other at an interval of 90°. Therefore, as shown in FIG. 2A, the first regions A1 and A2 and the second regions B1 and B2 are formed at 4 parts in total, which is, however, provided only for illustration. The numbers of the first regions A1 and A2 and the second regions B1 and B2 may vary in various manners according to the desired rupture pressure of secondary battery.

As shown in FIGS. 2B and 2C, the bottom portion 111 includes a first surface 111a directed toward the electrode assembly, a second surface 111b opposite to the first surface 111a and being substantially planar, and the safety vent 1110 may be formed to have a predetermined depth from the second surface 111b. Alternatively, the safety vent 1110 may be formed to have a predetermined depth from the first surface 111a. In this case, however, it has been revealed that the safety vent 1110 is prone to cracks due to an external shock.

In addition, the safety vent 1110 includes a third surface 111c disposed between the first surface 111a and the second surface 111b, and a pair of fourth surfaces 111d connecting the third surface 111c and the second surface 111b and spaced apart from each other. Here, the third surface 111c is formed to be substantially parallel with the first surface 111a and the second surface 111b, and the fourth surfaces 111d are formed to be substantially perpendicular to the first surface 111a, the second surface 111b and the third surface 111c.

Here, a gradient is formed in the third surface 111c. That is to say, the third surface 111c has a gradient of a predetermined angle with respect to the first surface 111a.

Meanwhile, a thickness between the first surface 111a, forming the first regions A1 and A2, and the third surface 111c is approximately 10% to approximately 20% of a thickness between the first surface 111a and the second surface 111b. In addition, a thickness between the first surface 111a, forming the second regions B1 and B2, and the third surface 111c is approximately 30% to approximately 40% of a thickness between the first surface 111a and the second surface 111b. As described above, a gradient of a predetermined angle is formed in the first surface 111c between the first regions A1 and A2 and the second regions B1 and B2. For example, the thicknesses of the safety vent 1110 between the first regions A1 and A2 and the third surface 111c gradually increase from the first regions A1 and A2 to the second regions B1 and B2.

If the thicknesses of the first regions A1 and A2 are approximately 10% smaller than the thickness between the first surface 111a and the second surface 111b, the safety vent 1110 may be ruptured when the internal pressure is relatively low. In addition, if the thicknesses of the first regions A1 and A2 are approximately 20% greater than the thickness between the first surface 111a and the second surface 111b, the safety vent 1110 may be ruptured when the internal pressure is relatively high.

If the thicknesses of the second regions B1 and B2 are approximately 30% smaller than the thickness between the first surface 111a and the second surface 111b, the safety vent 1110 may be cracked even by a minor external shock. If the thicknesses of the second regions B1 and B2 are approximately 40% greater than the thickness between the first surface 111a and the second surface 111b, the safety vent 1110 may not be cracked. In this case, however, the safety vent 1110 may not be ruptured when the internal pressure is relatively high.

Here, the rupture means that the safety vent 1110 normally operates due to the internal pressure of the battery, and the cracking means that the safety vent 1110 abnormally operates.

As shown in FIG. 2D, in the cross-sectional view taken along the circumference formed by A1-B1-A2-B2-A1 shown in FIG. 2A, the thicknesses between the first surface 111a and the third surface 111c vary with a gradient. For example, the thicknesses of the first regions A1 and A2 are smaller than the thicknesses of the second regions B1 and B2, and a thickness gradient is formed between the first regions A1 and A2 and the second regions B1 and B2. Therefore, the first regions A1 and A2 having relatively small thicknesses operate as ruptured parts of the safety vent 1110 that are ruptured when the internal pressure of the secondary battery increases, and the second regions B1 and B2 of the safety vent 1110 having relatively large thicknesses operate as supporting parts of the safety vent 1110 to prevent the safety vent 1110 from being cracked due to an external shock. Here, the thicknesses of the first regions A1 and A2 and the thicknesses of the second regions B1 and B2 and gradient angles therebetween are appropriately controlled, thereby controlling the rupture pressure of the secondary battery and preventing a crack phenomenon due to external shocks.

Figure 3A:
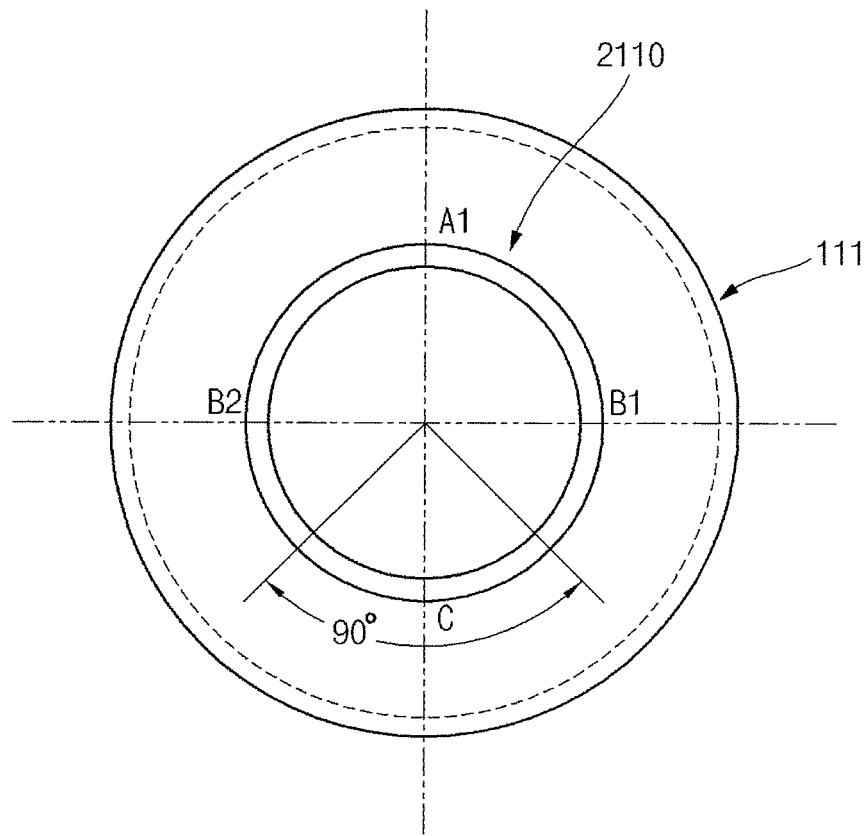
FIG. 3A is a bottom view illustrating a bottom portion of a cylindrical can in a cylindrical lithium ion secondary battery according to another embodiment of the present invention.
Figure 3B:
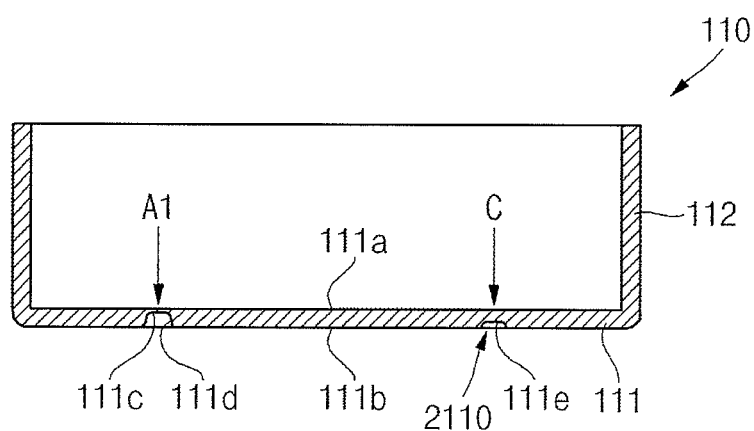
FIG. 3B is a cross-sectional view taken along the line A1-C of FIG. 3A.
Figure 3C:
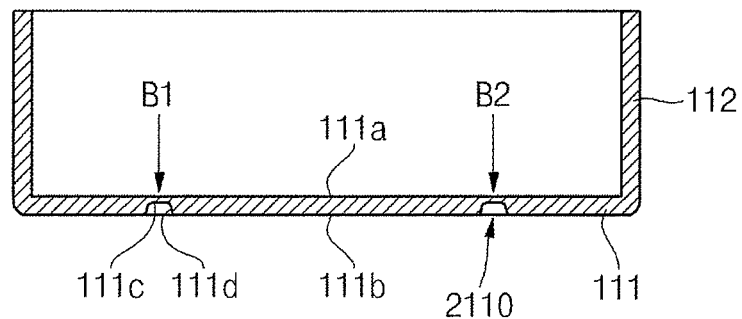
FIG. 3C is a cross-sectional view taken along the line B1-B2 of FIG. 3A.
Figure 3D:
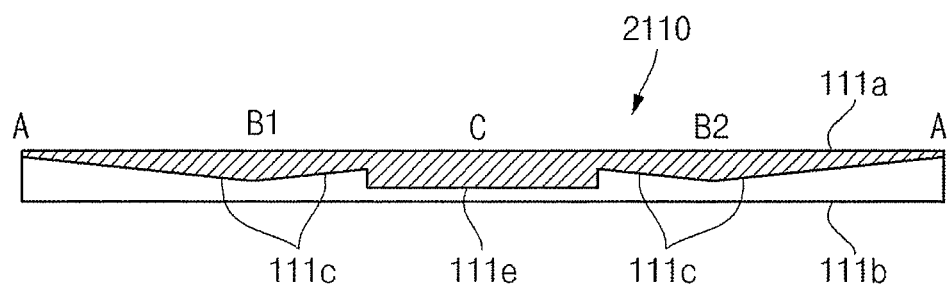
FIG. 3D is an imaginary lay-out cross-sectional view of a safety vent.

FIG. 3A is a bottom view illustrating of a bottom portion of a cylindrical can in a cylindrical lithium ion secondary battery according to another embodiment of the present invention, FIG. 3B is a cross-sectional view taken along the line A1-C of FIG. 3A, FIG. 3C is a cross-sectional view taken along the line B1-B2 of FIG. 3A, and FIG. 3D is an imaginary lay-out cross-sectional view of a safety vent.

As shown in FIGS. 3A to 3C, the safety vent 1110 having a thickness gradient has a first region A1, two second regions B1 and B2 and a third region C. Here, a thickness gradient is formed between the first region A1 and the second regions B1 and B2.

Meanwhile, the third region C further includes a first surface 111a and a fifth surface 111e opposite to the first surface 111a. The fifth surface 111e is formed to be substantially parallel with the first surface 111a, the second surface 111b and the third surface 111c and has a level between the third surface 111c and the second surface 111b. Therefore, a thickness of the third region C is greater than thicknesses of the first regions A1 and A2 and the second regions B1 and B2. In more detail, a thickness between the first surface 111a and the fifth surface 111e is approximately 60% to approximately 70% of a thickness between the first surface 111a and the second surface 111b.

In addition, the third region C is preferably formed at an angle of approximately 80° to approximately 100° with respect to the circumference, more preferably approximately 90°. Therefore, as shown in FIG. 3A, the two second regions B1 and B2 are formed at opposite sides of the first region A1 and the third region C is formed between the two second regions B1 and B2 at an angular interval within a range of approximately 80° to approximately 90°.

If the range of the angle in which the third region C is formed is smaller than approximately 80°, the safety vent 1110 may be cracked even by a minor external shock. If the range of the angle in which the third region C is formed is smaller than approximately 100°, the safety vent 1110 may not be ruptured when the internal pressure is relatively high. In addition, if the thickness of the third region C1 is approximately 60% smaller than the thickness between the first surface 111a and the second surface 111b, the safety vent 1110 may be cracked even by a minor external shock. If the thickness of the third region C1 is approximately 70% greater than the thickness between the first surface 111a and the second surface 111b, the safety vent 1110 may not be cracked. In this case, however, the safety vent 1110 may not be ruptured when the internal pressure is relatively high.

Figure 3E:
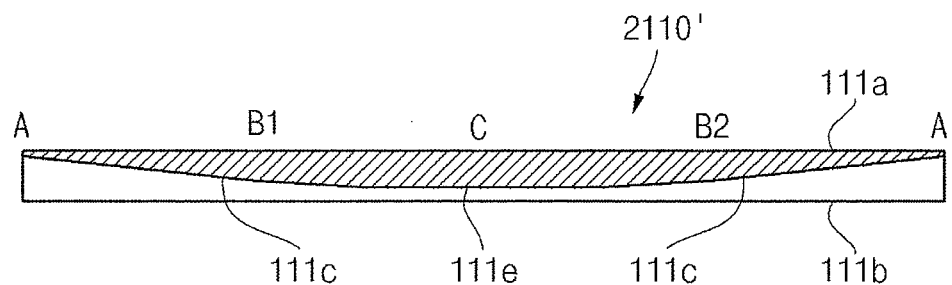
FIG. 3E is an imaginary lay-out cross-sectional view of a safety vent.

In addition, as shown in FIG. 3D, the safety vent 1110 may be configured to have thicknesses gradually decreasing from the second regions B1 and B2 to the third region C. In addition, as shown in FIG. 3E, the safety vent 1110 may be configured to have thicknesses gradually increasing from the second regions B1 and B2 to the third region C. If the thickness of the safety vent 1110 gradually decreases from the second regions B1 and B2 to the third region C, as shown in FIG. 3D, the safety vent 1110 can be controlled to be ruptured when the internal pressure is relatively low. In addition, as shown in FIG. 3E, if the thickness of the safety vent 1110 gradually increases from the second regions B1 and B2 to the third region C, the safety vent 1110 can be controlled so as not to be cracked at a relatively high external shock.

As described above, the thicknesses of the first regions A1 and A2, the second regions B1 and B2 and the third region C and gradient angles therebetween can be appropriately controlled, thereby controlling the rupture pressure of the secondary battery and preventing a crack phenomenon due to external shocks.

Figure 4A:
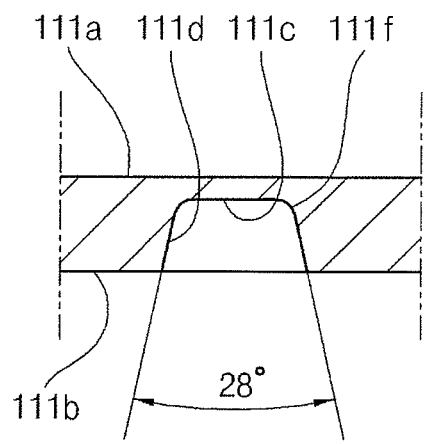
FIGS. 4A and 4B are cross-sectional view of a safety vent formed on a bottom portion of a cylindrical can in the cylindrical lithium ion secondary battery shown in FIG. 3A.
Figure 4B:
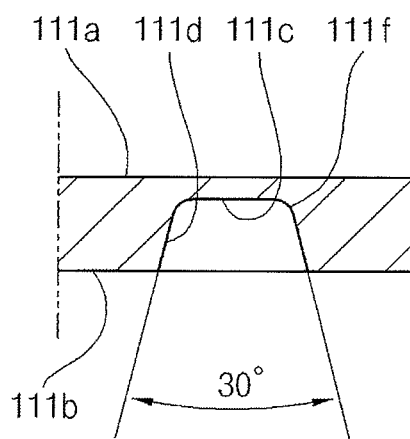

FIGS. 4A and 4B are cross-sectional view of a safety vent formed on a bottom portion of a cylindrical can in the cylindrical lithium ion secondary battery shown in FIG. 3A.

As shown in FIGS. 4A and 4B, the safety vent 1110 has a third surface 111c opposite to the first region A1 and a pair of fourth surfaces 111d formed at opposite sides of the third surface 111c and connected to the first surface 111a. Here, an angle formed between the pair of fourth surfaces 111d may range from approximately 28° to approximately 30°, and a curved surface 111f having a predetermined curvature may be formed between the third surface 111c and the fourth surfaces 111d.

If the angle between the pair of fourth surfaces 111d is smaller than approximately 28°, the safety vent 1110 may not operate when the internal pressure is relatively high. If the angle between the pair of fourth surfaces 111d is greater than approximately 30°, the safety vent 1110 may operate when the internal pressure is relatively low. In addition, if the angle between the pair of fourth surfaces 111d is greater than approximately 30°, the safety vent 1110 may be cracked even by a minor external shock.

As described above, according to the present invention, the rupture pressure of the secondary battery can be controlled by controlling the angle between the pair of fourth surfaces 111d and the curvature of the curved surface 111d between the third surface 111c and the fourth surfaces 111d.

Certain embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A cylindrical lithium ion secondary battery comprising:
a cylindrical can;
an electrode assembly accommodated in the cylindrical can with an electrolyte; and
a cap assembly sealing the cylindrical can,
wherein the cylindrical can has a cylindrical bottom portion and a side portion extending from the bottom portion to the cap assembly, and a safety vent having a thickness gradient is formed on the bottom portion,
wherein the cylindrical bottom portion of the cylindrical can includes a first surface directed toward the electrode assembly, a second surface opposite to the first surface and being planar, and the safety vent is formed on the second surface,
wherein the safety vent further includes a third surface disposed between the first surface and the second surface and a pair of spaced-apart fourth surfaces connecting the third surface and the second surface, and wherein the safety vent includes a first region having a thickness between the first surface and the third surface being 10% to 20% of a thickness between the first surface and the second surface, and a second region having a thickness between the first surface and the third surface being 30% to 40% of a thickness between the first surface and the second surface and the third surface between the first region and the second region has a gradient with respect to the first surface.

2. The cylindrical lithium ion secondary battery of claim 1, wherein the safety vent is shaped of a circle concentric with the bottom portion and having a diameter different from that of the bottom portion.

3. The cylindrical lithium ion secondary battery of claim 1, wherein the third surface has a gradient with respect to the first surface.

4. The cylindrical lithium ion secondary battery of claim 1, wherein the safety vent is circular in shape and the first region and the second region are positioned on the circumference of the safety vent and alternate with each other at an angular interval of 90°.

5. The cylindrical lithium ion secondary battery of claim 1, wherein a third region having a uniform thickness is further formed between the first region and the second region.

6. The cylindrical lithium ion secondary battery of claim 5, wherein the third region includes the first surface and a fifth surface opposite to the first surface and a thickness between the first surface and the fifth surface is 60% to 70% of the thickness between the first surface and the second surface.

7. The cylindrical lithium ion secondary battery of claim 6, wherein a thickness ranging from the second region to the third region gradually decreases.

8. The cylindrical lithium ion secondary battery of claim 6, wherein a thickness ranging from the second region to the third region gradually increases.

9. The cylindrical lithium ion secondary battery of claim 6, wherein a thickness ranging from the second region to the third region gradually decreases.

10. The cylindrical lithium ion secondary battery of claim 1, wherein the pair of fourth surfaces are formed at an angle of 28° to 30°.

11. The cylindrical lithium ion secondary battery of claim 1, wherein a curved surface is disposed between the third surface and the fourth surface.

12. The cylindrical lithium ion secondary battery of claim 1, wherein the pair of fourth surfaces are formed at an angle of 28° to 30° and wherein a curved surface is disposed between the third surface and the fourth surface.

13. A lithium ion secondary battery comprising:

a can;

an electrode assembly positioned within the can with an electrolyte;

a cap assembly sealing the can;

wherein the can has a bottom portion and a side portion that extend from the bottom portion to the cap assembly, and wherein a safety vent having a first length is formed in the bottom portion and wherein the thickness of the safety vent varies over the first length of the safety vent such that the cross-sectional profile varies along the first length of the safety vent, wherein the can is cylindrical and the bottom portion of the can is circular in shape and wherein the safety vent defines a circle having a circumference of the first length, and wherein the safety vent includes a first region having a thickness between the first surface and the third surface being 10% to 20% of a thickness between the first surface and the second surface, and a second region having a thickness between the first surface and the third surface being 30% to 40% of a thickness between the first surface and the second surface and the third surface between the first region and the second region has a gradient with respect to the first surface.

14. The cylindrical lithium ion secondary battery of claim 13, wherein the safety vent is circular in shape and the first region and the second region are positioned on the circumference of the safety vent and alternate with each other at an angular interval of 90°.

15. The cylindrical lithium ion secondary battery of claim 13, wherein a third region having a uniform thickness is further formed between the first region and the second region and wherein the third region includes the first surface and a fifth surface opposite to the first surface and a thickness between the first surface and the fifth surface is 60% to 70% of the thickness between the first surface and the second surface.

* * * * *